US009401007B2

United States Patent
Sohn

(10) Patent No.: US 9,401,007 B2
(45) Date of Patent: Jul. 26, 2016

(54) IMAGE PROVIDING SYSTEM, APPARATUS FOR SAME, AND IMAGE PROVIDING METHOD

(71) Applicant: SK Planet Co., Ltd., Seoul (KR)

(72) Inventor: Sang Mok Sohn, Seongnam-si (KR)

(73) Assignee: SK PLANET CO., LTD., Seoul (KR)

( * ) Notice: Subject to any disclaimer, the term of this patent is extended or adjusted under 35 U.S.C. 154(b) by 214 days.

(21) Appl. No.: 14/008,433

(22) PCT Filed: Oct. 9, 2012

(86) PCT No.: PCT/KR2012/008144
§ 371 (c)(1),
(2) Date: Sep. 27, 2013

(87) PCT Pub. No.: WO2013/105716
PCT Pub. Date: Jul. 18, 2013

(65) Prior Publication Data
US 2014/0055497 A1      Feb. 27, 2014

(30) Foreign Application Priority Data

Jan. 10, 2012  (KR) ........................ 10-2012-0002866

(51) Int. Cl.
*G06T 3/40*       (2006.01)
*H04N 21/462*    (2011.01)
(Continued)

(52) U.S. Cl.
CPC ...... *G06T 3/4092* (2013.01); *H04N 21/234363* (2013.01); *H04N 21/25825* (2013.01); *H04N 21/2662* (2013.01); *H04N 21/462* (2013.01);*H04N 21/6582* (2013.01); *H04W 88/02* (2013.01)

(58) Field of Classification Search
CPC .......... H04N 1/40068; H04N 1/00204; H04N 2201/33328; H04N 2201/33321
See application file for complete search history.

(56) References Cited

U.S. PATENT DOCUMENTS

| 7,646,433 B2* | 1/2010 | Chen et al. ..................... 348/581 |
| 2007/0016925 A1* | 1/2007 | Vaysman et al. ................ 725/39 |

(Continued)

FOREIGN PATENT DOCUMENTS

| KR | 1020070059313 A | 6/2007 |
| KR | 1020110020147 A | 3/2011 |

(Continued)

OTHER PUBLICATIONS

International Search Report for application No. PCT/KR2012/008144 dated Feb. 28, 2013.

*Primary Examiner* — Jeffrey Chow
(74) *Attorney, Agent, or Firm* — Hauptman Ham, LLP

(57) ABSTRACT

An image providing system includes: a terminal to run at least one application, to request an image from a service device, to determine whether the application supports all screen densities, to extract and transmit a resolution value of an area for displaying the image when all screen densities are supported, and to extract and transmit screen density information supported in the application when not all screen densities are supported; a service device to resize the image to match at least one resolution, to check a resolution value of the terminal and provide the image resized to match the checked resolution value to the terminal when the image is requested from the terminal, and when only screen density information is transmitted from the terminal, to calculate a resolution value from the screen density information and provide the image resized to match the calculated resolution value to the terminal.

8 Claims, 5 Drawing Sheets

(51) Int. Cl.
*H04W 88/02* (2009.01)
*H04N 21/2343* (2011.01)
*H04N 21/258* (2011.01)
*H04N 21/2662* (2011.01)
*H04N 21/658* (2011.01)

(56) References Cited

U.S. PATENT DOCUMENTS

2007/0132787 A1* 6/2007 Ko .................................. 345/660
2012/0092305 A1* 4/2012 Barnes ................... G09G 5/391
    345/204
2013/0063492 A1* 3/2013 Washington ........... G09G 5/003
    345/660

FOREIGN PATENT DOCUMENTS

| KR | 1020110026361 A | 3/2011 |
| KR | 1020110087711 A | 8/2011 |

* cited by examiner

IMAGE PROVIDING SYSTEM, APPARATUS FOR SAME, AND IMAGE PROVIDING METHOD

CROSS REFERENCE TO RELATED APPLICATION

This application claims the priority of Korean Patent Application No. 10-2012-0002866, filed on Jan. 10, 2012 in the Korean Intellectual Property Office (KIPO), the disclosure of which is hereby incorporated by reference herein in its entirety. Further, this application is the National Phase application of International Application No. PCT/KR2012/008144, filed Oct. 9, 2012, which designates the United States and was published in English. Each of these applications is hereby incorporated by reference in their entirety into the present application.

TECHNICAL FIELD

The present disclosure relates to an image providing system that provides images resized to match display specifications of a terminal, and more particularly, to an image providing system that can provide images appropriate for display specifications of a terminal even when accurate resolution information is not provided from the terminal, a device therefor, and a method thereof.

BACKGROUND

Recently, as open environments for mobile communication terminals are provided, open applications and platform environments for service differentiation are demanded.

More specifically, as smart phones in which a user can freely select and install a desired mobile application are rapidly growing, open market places (OMPs) that can freely trade such mobile applications have been activated.

However, since various operating systems are used in current smart phones, it is necessary for application developers to develop mobile applications in consideration of various operating system environments.

More particularly, an operating system (OS) manages resources and functions of a terminal having the OS ported therein, and enables access to all or a part of resources and functions of the terminal when requested by an application ported in the terminal. This is performed such that the OS provides application programming interfaces (APIs). In other words, applications access resources and functions of a device with reference to APIs provided by the OS. Therefore, in order for developers to develop applications of a device having a specific OS ported therein, it is necessary to develop applications according to formats of APIs provided by the OS. Under current conditions in which various OSs are used, developers need to develop the same applications independently according to APIs of each OS.

Moreover, recently developed mobile applications are likely to be executed in conjunction with a server for customized services and real time services. For example, a mobile application mounted in the terminal includes only default executable codes and resources for executing a corresponding application are received from the server in real time.

Particularly, since advertising services need to change advertising contents in real time, the server manages advertising images, screens an appropriate advertising image according to an advertising image request from a mobile communication terminal, and provides the screened image to the mobile communication terminal.

In this case, in order to meet various display specifications of the mobile communication terminal, the server checks display specifications of the mobile communication terminal and resizes images to have a resolution matching the checked display specifications.

In this case, since it is difficult for the server to manage display specifications of all mobile communication terminals, resolution information of the terminal is generally received from the mobile communication terminal.

Some operating systems support a screen having various sizes, ratios, and densities. However, it is difficult to check accurate screen information of a corresponding mobile communication terminal depending on environment settings. In this case, it is difficult for the server to provide images appropriate for the display specifications of the corresponding mobile communication terminal.

More specifically, in a mobile communication terminal having a specific OS, when the application is set not to accommodate all screen densities (anyDensity=false), since a dot per inch (dpi) value for indicating a screen density is provided from the terminal instead of accurate resolution information, it is difficult for the server to provide an advertising image having an appropriate resolution.

SUMMARY

Disclosed herein is an image providing system that can provide images appropriate for display specifications of a terminal even when accurate resolution information is not provided from the terminal, a device therefor, and a method thereof.

In accordance with some embodiments, an image providing system may include a terminal and a service device. The terminal may be configured to run at least one application, to request an image from a service device in response to a request from the running application, to determine whether the application supports all screen densities, to extract and transmit a resolution value of an area for displaying the image when all screen densities are supported, and to extract and transmit screen density information supported in the application when not all screen densities are supported. The service device may be configured to resize the image to match at least one resolution, to check a resolution value of the terminal and provide the image resized to match the checked resolution value to the terminal when the image is requested from the terminal, and when only screen density information is transmitted from the terminal, to calculate a resolution value from the screen density information and provide the image resized to match the calculated resolution value to the terminal.

In accordance with some embodiments, a service device may include a storage unit, a communication unit, and an image providing unit. The storage unit may be configured to store one or more images to be provided to a terminal, each of the images being resized as at least one image to match at least one resolution. The communication unit may be configured to transmit and receive data to and from the terminal via a network. The image providing unit may be configured to check a resolution of the terminal and provide the image resized to match the checked resolution to the terminal when the image is requested from the terminal through the communication unit, and when only screen density information is transmitted from the terminal, to calculate an appropriate resolution value from the screen density and provide the image resized to match the calculated resolution value to the terminal.

The service device according to an embodiment may further include an image resizing unit configured to resize each of the images according to at least one resolution, to further resize each of the resized images at a ratio set to match at least one screen density, and to store the further resized images in the storage unit.

The image providing unit may be further configured to calculate the resolution value of the terminal from the screen density information using $$R = V_{dpi} \times \frac{1}{X}$$

(R represents a resolution value, $V_{dpi}$ is a dpi value of an area on which a corresponding image received from the terminal is displayed, and X is a ratio value set to match the screen density).

In accordance with some embodiments, a terminal may include a control unit, a storage unit, an output unit, a communication unit, and an input unit. The control unit may be configured to run at least one application, to check whether the running application supports all screen densities in response to a request for a specific image from the running application, to extract a resolution value of an area for displaying the specific image when all screen densities are supported, and to extract screen density information supported in the application and obtain the specific image having a resolution corresponding to both the resolution value and the screen density information when not all screen densities are supported. The storage unit may be configured to store the at least one application. The output unit may be configured to output an execution screen of the application and the image. The communication unit may be configured to transmit and receive data via a network under control of the control unit. The input unit may be configured to receive a user's input including execution of the application.

The control unit may be further configured to transmit a request message for the specific image, the resolution value and the screen density information to a service device through the communication unit, and to receive the specific image from the service device.

The storage unit may be further configured to further store images having a plurality of resolutions and resized in consideration of the screen density. The control unit may be further configured to calculate the resolution value from the screen density information and to obtain the specific image corresponding to the resolution value from the storage unit.

In accordance with some embodiments, an image providing method includes resizing images to be provided to a terminal to match at least one resolution, further resizing each of the resized images at a ratio corresponding to at least one screen density, receiving an image request from the terminal, receiving screen density information from the terminal, calculating a resolution value of the terminal from the screen density information, and extracting the image resized to match the calculated resolution value to provide the extract image to the terminal.

The screen density information may include a screen density value supported in an application from which an image including at least one of ldpi, mdpi, hdpi, and xhdpi is requested, and a dpi value of an area on which the image is displayed.

The further resizing at a ratio corresponding to at least one screen density may include at least one of further resizing each of the resized images having at least one resolution at a ratio of about 1.3333 corresponding to the screen density of ldpi, further resizing each of the resized images having at least one resolution at a ratio of about 1 corresponding to the screen density of mdpi, further resizing each of the resized images having at least one resolution at a ratio of about 0.6666 corresponding to the screen density of hdpi, and further resizing each of the resized images having at least one resolution at a ratio of about 0.5 corresponding to the screen density of xhdpi.

In accordance with some embodiments, a computer-readable recording medium records a program to execute a function of resizing images to be provided to a terminal to match at least one resolution, a function of resizing each of the images that have been resized to have at least one resolution with a ratio corresponding to at least one screen density, a function of receiving an image request from the terminal, a function of receiving screen density information from the terminal, a function of calculating a resolution value of the terminal from the screen density information, and a function of extracting the image resized to match the calculated resolution value and providing the image to the terminal.

According to this disclosure, it is possible to calculate an accurate resolution value of the terminal using only the screen density information and dpi information received from the terminal. As a result, even when the accurate resolution information is not provided depending on environment settings of the terminal, it is possible to obtain an accurate resolution value of the terminal using only the obtained screen ratio and dpi information and provide images having a resolution appropriate for the terminal.

Moreover, according to embodiments, in the operation of checking the resolution of the terminal, it is possible to directly calculate the resolution of the terminal without performing individual comparison using a case statement. Therefore, it is possible to decrease the number of calculation clocks for checking the resolution.

DETAILED DESCRIPTION

Hereinafter, exemplary embodiments of the present disclosure will be described in detail with reference to the accompanying drawings. However, detailed descriptions of well-known functions or configurations that unnecessarily obscure the gist of the disclosure in the following explanations and accompanying drawings will be omitted. The same reference numbers will be used throughout this specification to refer to the same or like parts.

Moreover, terms and words used in this specification and claims should not be interpreted as limited to commonly used meanings or meaning in dictionaries and should be interpreted with meanings and concepts which are consistent with the technological scope of the disclosure based on the principle that the inventors have appropriately defined concepts of terms in order to describe the disclosure in the best way. Therefore, since the embodiments described in this specification and configurations illustrated in drawings are only exemplary embodiments and do not represent the overall technological scope of the disclosure, it is understood that the disclosure covers various equivalents, modifications, and substitutions at the time of filing of this application.

Figure 1:
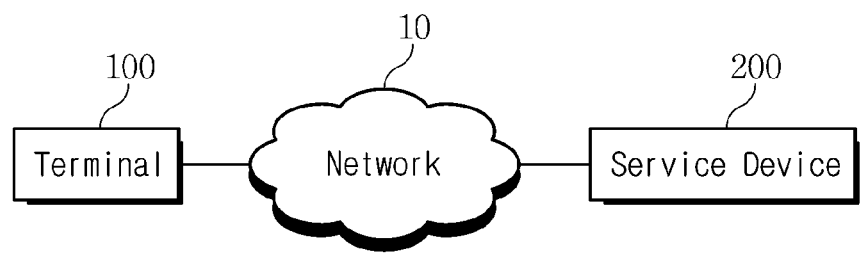
FIG. 1 is a schematic diagram illustrating a service system for providing an image in accordance with an embodiment of the present disclosure.

FIG. 1 is a schematic diagram illustrating a service system for providing an image in accordance with an embodiment of the present disclosure.

As illustrated in FIG. 1, the service system may include a terminal 100 and a service device 200 that perform data communications via a network 10.

Figure 2:
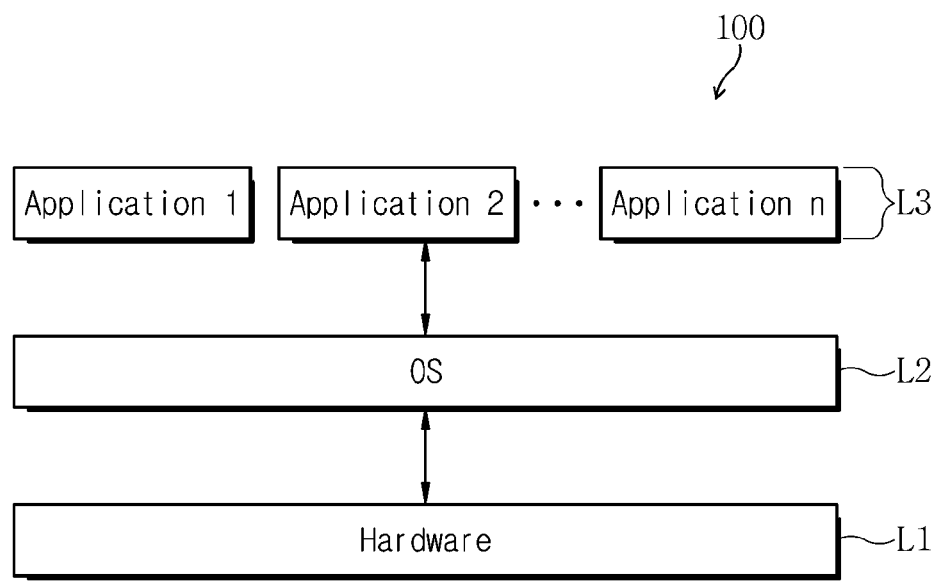
FIG. 2 is a schematic diagram illustrating an application execution structure of a terminal in accordance with an embodiment of the present disclosure.

The terminal 100 is a device including at least one application running on a specific OS, and receives resources, especially, images such as video/still images, from the service device 200 via the network 10 and displays the result when the application is running. As illustrated in FIG. 2, in the terminal 100, an operating system (L2) is installed in hardware L1 including, for example, an input unit, a touch unit, a storage unit, and a communication unit, and runs management and control functions of the hardware (L1). A plurality of applications (L3) are installed in the operating system (L2). In this case, the operating system (L2) provides application program interfaces (APIs) for interfacing with the plurality of applications (L3), and the applications (L3) use functions provided and supported by the operating system (L2) using open APIs.

In this case, the specific OS allows a type of a screen supported by the application (L3) to be explicitly designated. In this case, the type of the screen is represented as a screen size and a screen density. More specifically, applications based on the specific OS may select attributes such as smallScreens, normalScreens, largeScreens, and anyDensity. In this case, normalScreens indicates whether a medium resolution (for example, HVGA) is supported, smallScreens indicates whether a resolution lower than the medium resolution is supported, and largeScreens indicates whether a resolution greater than the medium resolution is supported. Meanwhile, anyDensity is an attribute to indicate whether the application supports all screen densities. Not all screen densities are supported when a value of the attribute is "false," whereas all screen densities are supported when a value of the attribute is "true." Especially, when the attribute value of anyDensity is "false," accurate resolution information of a corresponding terminal 100 is not provided, and a dot per inch (DPI) value for indicating a screen density is provided.

Even in this case, the terminal 100 transmits only the screen density and a ratio value to the service device 200, receives an image resized to match a resolution of the terminal 100, and displays the result. This operation will be described in detail with descriptions of an image providing method.

Examples of the terminal 100 may include a personal computer (PC), laptop computer, mobile phone, tablet PC, navigation, smart phone, personal digital assistants (PDA), portable multimedia player (PMP) or digital broadcasting receiver such as a digital video broadcasting (DVB). These are only exemplary, and the terminal may include devices capable of communicating that have currently been developed and commercialized or that will be developed in addition to the above examples.

The service device 200 is a service device that includes a function of providing images such as videos and still images to the terminal 100, and checks the resolution of the terminal 100 and provides an image resized to match the checked resolution according to an image request from the terminal 100.

In particular, when images, for example, advertising images or background images, are requested from a specific application installed in the terminal 100, the service device 200 resizes the images according to resolution information received from the terminal 100 and provides the resized images to the terminal 100. In this case, when the specific application is set not to support all screen densities (anyDensity=false), the resolution of the terminal 100 is calculated using only information transmitted from the terminal 100, that is, a dpi value and a screen ratio value, and corresponding images are resized to match the calculated resolution. Here, an operation of calculating an optimal resolution of the terminal 100 will be described in detail in the image providing method with reference to FIGS. 5 and 6.

The service device 200 may include any service device that includes a function of providing images to the terminal 100. For example, various service devices such as advertising service devices and content providing/distributing devices may be included. More specifically, the advertising service devices may provide advertising images to be displayed in a specific area on a running screen of the application according to a request from the application installed in the terminal 100.

Figure 3:
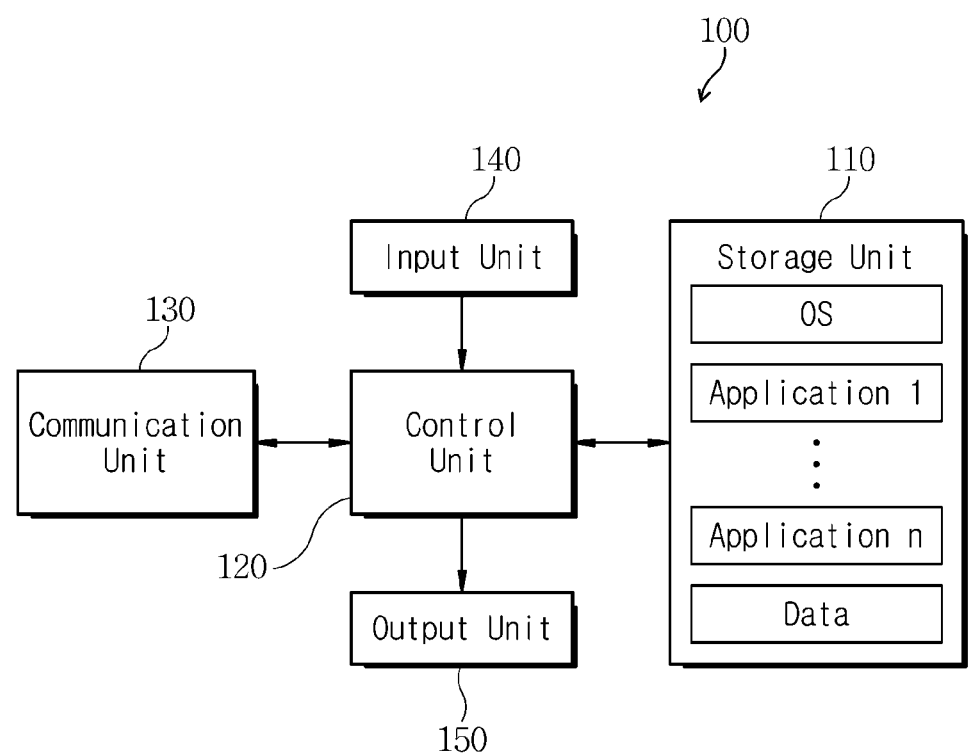
FIG. 3 is a block diagram illustrating a configuration of the terminal in accordance with an embodiment of the present disclosure.

FIG. 3 is a block diagram illustrating a configuration of the terminal in accordance with an embodiment of the present disclosure.

As illustrated in FIG. 3, the terminal 100 receives images from the service device 200 and displays the images, and may include a storage unit 110, a control unit 120, a communication unit 130, an input unit 140, and an output unit 150.

The storage unit 110 is configured to store programs and data to be processed in the terminal 100, and includes a main memory such as a read access memory (RAM) and a storage such as a hard disk drive (HDD) or a flash memory. Here, the RAM has the same access time of data stored in any location and data or programs running in the terminal 100 are loaded therein. An auxiliary storage unit such as the HDD or flash memory has different access times according to a stored location and data or programs are stored therein due to a large capacity while speed is slower than the memory.

Specifically, the storage unit 110 stores an OS program that manages and controls hardware of the terminal 100 and provides execution environments for applications. When power of the terminal 100 is turned on, the OS program is executed first by the control unit 120 and provides execution environments of the terminal 100. In particular, the OS program may support various screen sizes and resolutions.

Moreover, the storage unit 110 stores at least one application. The application is practically stored in the HDD or flash memory and is loaded in the memory under control of a control unit 410 when execution is requested. The application is programmed to be operated in the OS and may be developed using a software development kit (SDK) based on the OS. In this case, the application may designate a screen size to be supported in a corresponding application by setting attribute values such as smallScreens, normalScreens, largeScreens, and anyDensity due to support of the OS.

Further, the storage unit 110 stores various user data in addition to data necessary for operating, for example, the OS program and application programs and data generated by such operations.

The control unit 120 controls the overall operations of the terminal 100, executes the OS program first, and executes the application in the execution environments built by the OS program. In this case, when the application requests a specific image from the service device 200, the control unit 120 checks whether the application is set to accommodate all screen densities. When it is determined that not all screen densities are accommodated, the control unit 120 checks a screen density (for example, ldpi, mdpi, hdpi, and xhdpi) of the terminal 100 and a dpi value of an area on which the image is displayed, and transmits the results to the service device 200. Then, the image resized to have a resolution based on the screen density and dpi value of the terminal 100 is received from the service device 100 and displayed on the area.

The communication unit 130 performs data communications via the network 10, and more specifically, transmits information associated with the image request and resolution, that is, the screen density and dpi value, to the service device 200 under control of the control unit 120, and receives images from the service device 200.

The input unit 140 is configured to generate a user input signal corresponding to a user input of the terminal 100, and includes, for example, a plurality of input keys and function keys configured to receive number or text information and set various functions. The user input signal is generated from a corresponding input key or function key according to a user's manipulation and is delivered to the control unit 120. Here, the user input signal may include, for example, an execution request signal of a specific application and a specific function selection signal of a running application.

The input unit 140 may include at least one of general input devices such as a keyboard, mouse, and touchpad, and may also include various types of input devices currently under development or to be developed.

The output unit 150 outputs operation states and results under control of the control unit 120 and outputs a user interface screen for input. When the specific application is executed, an execution result of the running application is displayed on the screen. That is, a visually represented part (for example, backgrounds, menus, photos, videos, text, and icons) in the execution result of the application is displayed. Particularly, the image received from the service device 200 under control of the control unit 120 is displayed on a designated display area. The output unit 150 may be implemented as a liquid crystal display (LCD) or touch screen. When the output unit 150 is implemented as the touch screen, all or a part of functions of the input unit 140 may be performed.

Figure 4:
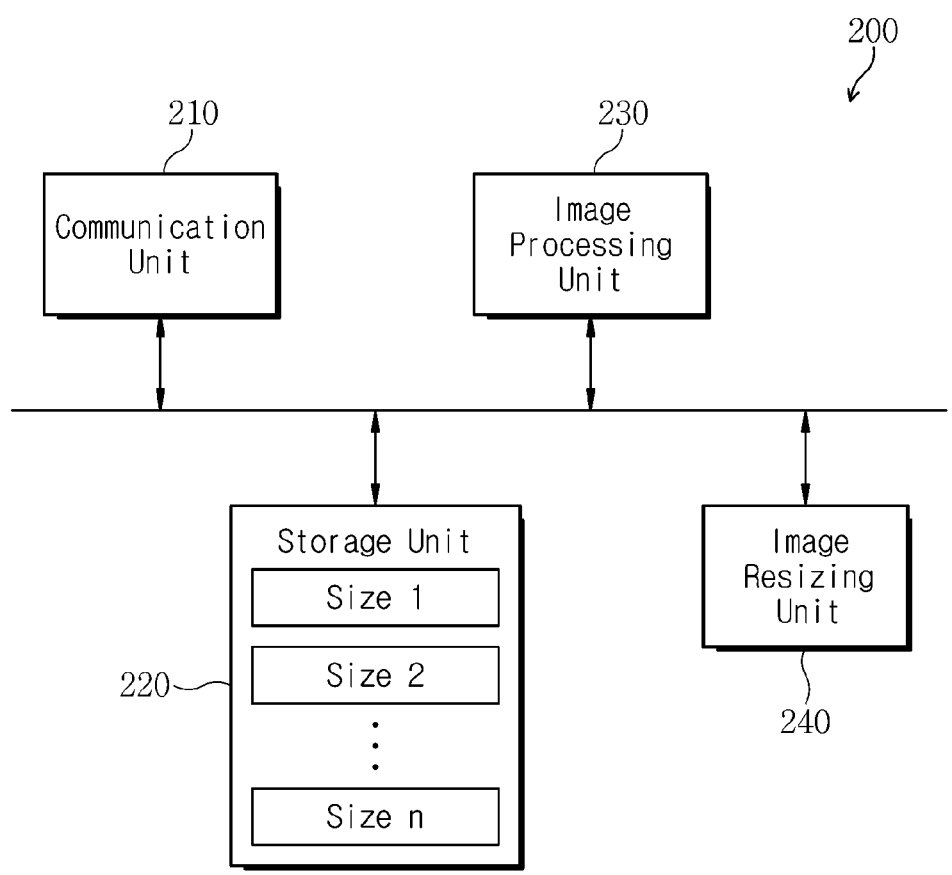
FIG. 4 is a block diagram illustrating a configuration of a service device in accordance with an embodiment of the present disclosure.

FIG. 4 is a block diagram illustrating a configuration of a service device in accordance with an embodiment of the present disclosure.

As illustrated in FIG. 4, the service device 200 may include a communication unit 210, a storage unit 220, an image providing unit 230, and an image resizing unit 240.

The communication unit 210 is configured to transmit and receive data with at least one terminal 100 via the network 10, receives the resolution information and image request from the terminal 100, and transmits the image resized to match the resolution of the terminal 100 to the terminal 100.

The storage unit 220 stores at least one image to be provided to the terminal 100. In this case, each image is stored as a plurality of images resized to have different resolutions and sizes such that various display specifications available in the terminal 100 are satisfied. For example, in the storage unit 220, a single image is resized to have a plurality of resolutions and the image for each resolution is resized to have two or more screen densities (for example, ldpi, mdpi, hdpi, and xhdpi).

When the image request is received from a specific terminal 100 through the communication unit 210, the image providing unit 230 checks resolution information transmitted from the terminal 100, selects an image having the checked resolution from the storage unit 220, and provides the image to the terminal 100. In this case, when the checked resolution information of the terminal 100 is the screen density and dpi value, the image providing unit 230 calculates the resolution from the screen density and dpi value using the following Equation 1.

$$R = V_{dpi} \times \frac{1}{X} \qquad [\text{Equation 1}]$$

In Equation 1, R represents a calculated resolution, and $V_{dpi}$ is the dpi value received from the terminal 100 and a dpi of an area on which a corresponding image is displayed. X is a ratio value set for each screen density (ldpi, mdpi, hdpi, and xhdpi) received from the terminal 100, and specifically, it is set to about 1.3333 for ldpi, 1 for mdpi, 0.6666 for hdpi, and 0.5 for xhdpi. A detailed description thereof is given below.

How to calculate the ratio value X will be described in detail in the image providing method.

According to an embodiment, when anyDensity=false is satisfied, a relation between the screen density value and the resolution provided for each of 9 types of resolutions mainly used in the terminal 100 is compared. As a result, it is known that there is a constant ratio between the provided screen density value (dpi) and resolution. That is, there is a constant ratio of about 1.3333 for ldpi, 1.0 for mdpi, 0.6666 for hdpi, and 0.5 for xhdpi. The following Table 1 compares a part of the relation between the 9 types of resolutions and each screen density value which are checked in this embodiment. As shown in Table 1, it is known that there is a constant ratio between the screen density and the resolution.

TABLE 1

| Resolution (pixel unit) | | Screen density (dips unit) | | | | Ratio | |
|---|---|---|---|---|---|---|---|
| Width | Height | Width | Height | dpi (char) | dpi (int) | Width | Height |
| 800 | 120 | 1066.666667 | 160 | ldpi | 120 | 1.333333 | 1.333333 |
|  |  | 800 | 120 | mdpi | 160 | 1 | 1 |
|  |  | 533.333333 | 80 | hdpi | 240 | 0.666667 | 0.666667 |
|  |  | 400 | 60 | xhdpi | 320 | 0.5 | 0.5 |
| 768 | 115 | 1024 | 153.333333 | ldpi | 120 | 1.333333 | 1.333333 |
|  |  | 768 | 115 | mdpi | 160 | 1 | 1 |
|  |  | 512 | 76.6666667 | hdpi | 240 | 0.666667 | 0.666667 |
|  |  | 384 | 57.5 | xhdpi | 320 | 0.5 | 0.5 |

TABLE 1-continued

| Resolution (pixel unit) | | Screen density (dips unit) | | | | Ratio | |
|---|---|---|---|---|---|---|---|
| | | | | dpi | dpi | | |
| Width | Height | Width | Height | (char) | (int) | Width | Height |
| 720 | 108 | 960 | 144 | ldpi | 120 | 1.333333 | 1.333333 |
| | | 720 | 108 | mdpi | 160 | 1 | 1 |
| | | 480 | 72 | hdpi | 240 | 0.666667 | 0.666667 |
| | | 360 | 54 | xhdpi | 320 | 0.5 | 0.5 |
| | | | | ... | | | |

When the relation is conversely used, it is possible to calculate a corresponding resolution value from the screen density value and the dpi value of the area to be displayed.

That is, when anyDensity=false is satisfied in the application that requests images of the terminal 10, only the screen density (ldpi, mdpi, hdpi, and xhdpi) value and dpi value are provided. It is possible to obtain an appropriate resolution by assigning a ratio value corresponding to the screen density to Equation 1 with the provided dpi value.

The image resizing unit 240 resizes images to be provided to the terminal 100 to match various resolutions and screen densities and stores the resized images in the storage unit 210. In this case, the image resizing unit 240 resizes each image to have two or more currently used resolutions. Then, the images that have been resized to have each resolution are resized again to match two or more screen densities according to Equation 1. That is, a width and height of each image is respectively resized at a ratio of 0.3333 for ldpi, 1 for mdpi, 0.6666 for hdpi, and 0.5 for xhdpi.

Hereinafter, image providing operations between the terminal 100 and the service device 200 configured as described above will be described in detail with reference to FIGS. 5 and 6.

Figure 5:
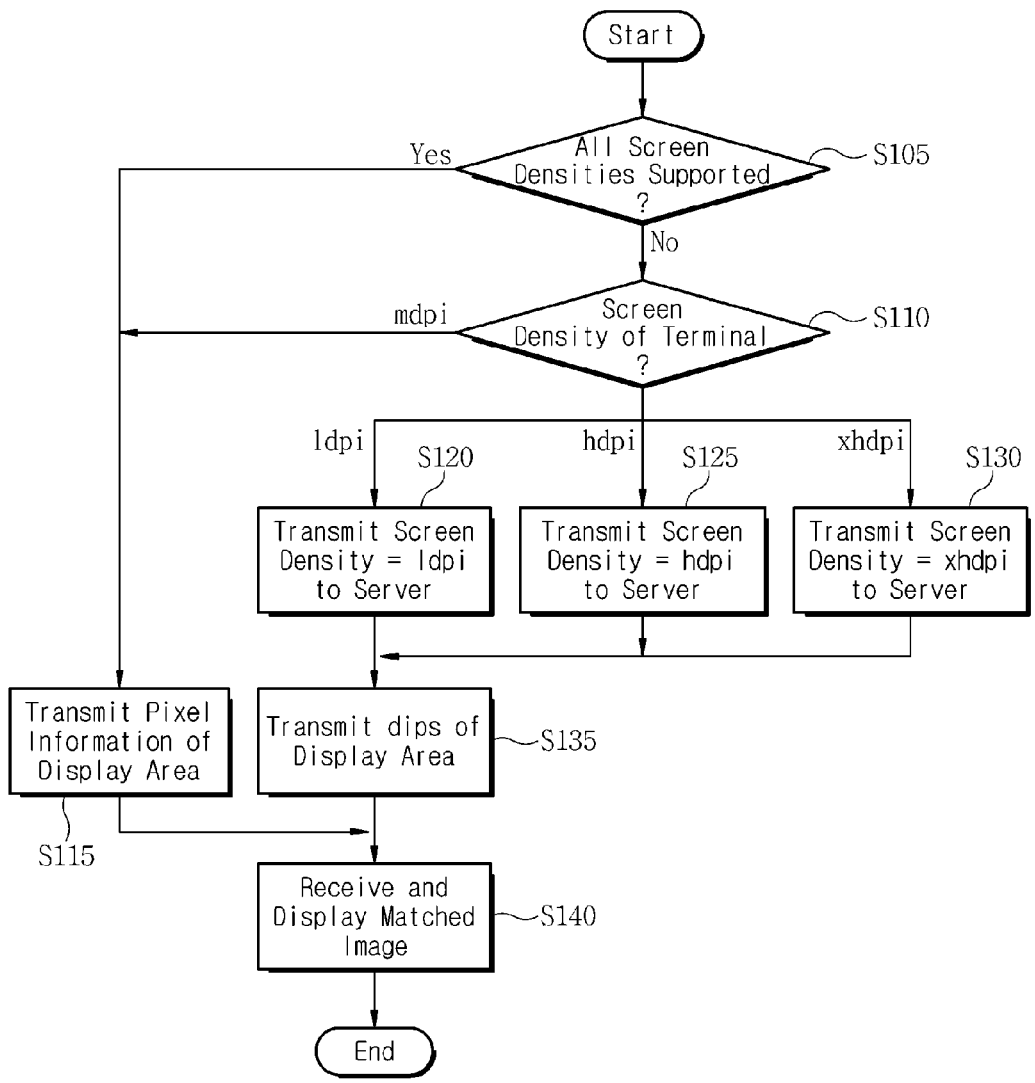
FIG. 5 is a flowchart illustrating image providing operations in the terminal in an image providing method in accordance with an embodiment of the present disclosure.

FIG. 5 is a flowchart illustrating image providing operations in the terminal in an image providing method in accordance with an embodiment of the present disclosure.

As illustrated in FIG. 5, in running of a specific application, when the image request is generated from the application, the terminal 100 checks setting conditions of the application first and determines whether all screen densities can be accommodated (S105). This is to determine whether anyDensity=true is satisfied by checking Manifest file of the application. Here, when anyDensity=true is satisfied, all screen densities are accommodated, and when anyDensity=false is satisfied, not all screen densities are accommodated.

As a determination result, when not all screen densities are accommodated, the screen density of the terminal 100 is checked (S110). Here, the screen density may be one of ldpi, mdpi, hdpi, and xhdpi. In general, ldpi as a low density has a value of about 120 dpi, mdpi as a medium density has a value of about 160 dpi, hdpi as a high density has a value of 240 dpi, and xhdpi as an extra high density has a value of dpi higher than hdpi.

As described above with reference to Table 1, there is a constant ratio between each resolution and screen density. In this case, mdpi as a medium density has a ratio of 1 and has the same value of resolution and screen density.

Therefore, as a checking result, when all screen densities are accommodated (anyDensity=true) in operation S105 or the screen density of the terminal is mdpi in operation S110, pixel information of a display area is directly transmitted to the service device 200 (S115).

On the other hand, when not all screen densities are accommodated in operation S105 or the screen density of the terminal is any one of ldpi, hdpi, and xhdpi in operation S110, the terminal 100 informs the service device 200 of the checked screen density information of the terminal, that is, any one of ldpi, hdpi, and xhdpi (S120, S125, and S130), and transmits the dpi value of the display area on which a corresponding image is displayed (S135).

Then, images having an appropriate resolution are received from the service device (200) and displayed on the display area (S140).

Figure 6:
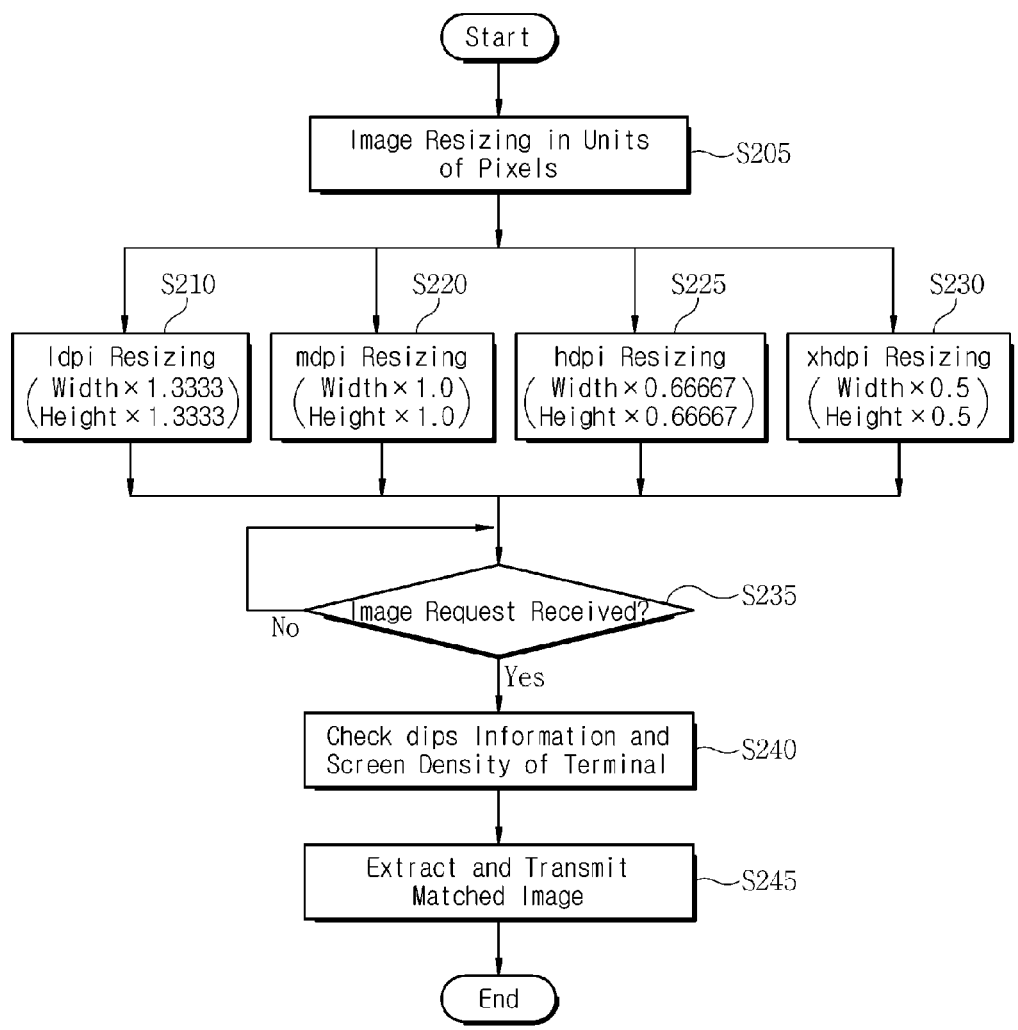
FIG. 6 is a flowchart illustrating image providing operations in the service device in the image providing method in accordance with an embodiment of the present disclosure.

Next, FIG. 6 is a flowchart illustrating image providing operations in the service device in the image providing method in accordance with an embodiment of the present disclosure.

As illustrated in FIG. 6, when there are images to be provided to the terminal 100, the service device 200 resizes the images to match various resolutions in units of pixels first (S205).

Next, the images that have been resized to match each resolution are respectively resized again to match the screen density of ldpi, mdpi, hdpi, and xhdpi (S210, S220, S225, and S230).

More specifically, the width and height of the images for each resolution are adjusted to have a ratio of 1.33333, and images corresponding to the screen density of ldpi are generated (S210).

Moreover, the width and height of the images for each resolution are adjusted to have a ratio of 1, and an image corresponding to the screen density of mdpi is generated (S220).

Further, the width and height of the images for each resolution are adjusted to have a ratio of 0.6666, and an image corresponding to the screen density of hdpi is generated (S225).

Furthermore, the width and height of the images for each resolution are adjusted to have a ratio of 3.5, and an image corresponding to the screen density of xhdpi is generated (S230).

Therefore, images resized to match 4 types of screen densities for each resolution are generated again.

In this way, in a state in which each image is resized to match the plurality of resolutions and screen densities and is stored in the storage unit 210, when a request of the image is received from the specific terminal 100 (S235), the service device 200 receives resolution information from the terminal 100, and more specifically, receives the resolution value or the screen density and dpi information (S240).

Then, a ratio corresponding to the received screen density is checked. The checked ratio and the dpi value are calculated using Equation 1, a screen size to be provided to the terminal 100 is checked, an image having the checked screen size is extracted from the storage unit 210, and the image is transmitted to the terminal 210 (S245).

In the above embodiments, while the image providing method based on a server-client method has been described, the image providing method according to the present disclosure may also be implemented as another method.

For example, a stand-alone method of the terminal 100 may also be used.

In this case, in operation S205 to S230 in FIG. 6, the terminal 100 further stores the plurality of images resized to have the plurality of resolutions in consideration of the screen density in the storage unit 110. During execution of the application, when a specific image is requested, the terminal checks whether the application is set to accommodate all screen densities in operation S105 to S110 in FIG. 5. When not all screen densities are accommodated, the screen density of the application is checked. A resolution value appropriate for the application is calculated from the checked screen density and dpi information of the display area. An image corresponding to the calculated resolution value is extracted from the storage unit 110 and the image is processed according to a logic of the application.

In this case, the plurality of images resized to have the plurality of resolutions stored in the terminal 100 may be previously received from the service device 200 and stored.

The image providing method according to embodiments of this disclosure may be implemented in a type of software that can be read by various computer means and may be recorded in a computer-readable recording medium. Here, the recording medium may include any one of or a combination of, for example, program instructions, data files, and data structures. The program instructions recorded in the recording medium may be specially designed and configured for the disclosure or may also be known and available for those skilled in computer software. Examples of the recording medium include a hard disk, a floppy disk, magnetic media such as a magnetic tape, optical media such as a compact disk read only memory (CD-ROM) and a digital video disk (DVD), magneto-optical media such as a floptical disk, and a specifically designed hardware device for storing and performing program instructions such as a ROM, random access memory (RAM), and flash memory. Examples of the program instructions may include a machine code generated by a compiler and a high-level code can be executed by a computer using, for example, an interpreter. Such a hardware device may be configured to be operated as at least one software module to perform operations of the disclosure and vice versa.

As described above, while this specification and drawings describe exemplary embodiments of the disclosure, it is apparent to those skilled in the art that various modifications based on the technological scope of the disclosure in addition to the embodiments disclosed herein can be made. Moreover, while specific terms are used in this specification and drawings, these are used with general meanings to easily describe technological content of the disclosure and to help understanding of the disclosure, and the disclosure is not limited thereto.

According to the disclosure, it is possible to calculate an accurate resolution value of the terminal using only the screen density information. As a result, even when the accurate resolution information is not provided due to environment settings of the terminal, it is possible to provide images having a resolution appropriate for the terminal using only the obtained screen density information.

Moreover, according to the disclosure, in the operation of checking the resolution of the terminal, it is possible to directly calculate the resolution of the terminal without performing individual comparison using a case statement. Therefore, it is possible to decrease the number of calculation clocks for checking the resolution.

What is claimed is:

1. An image providing system comprising:
    a terminal comprising
        a display unit, and
        a first processor configured to
            perform at least one application, wherein the application includes one attribute of a plurality of attributes representing screen densities, the plurality of attributes including a first attribute indicating a first screen density, a second attribute indicating a second screen density, and a third attribute indicating both of the first screen density and the second screen density,
            transmit an image request in response to a request for the image from the application,
            determine whether an attribute included in the application is the third attribute,
            transmit, when the included attribute is the third attribute, a resolution value of an area for displaying the requested image on the display unit, and
            transmit, when the included attribute is the first attribute or the second attribute, screen density information of the included attribute, and
            display an image received via a network on the display unit; and
    a service device configured to receive, via the network, the image request, the resolution value or the screen density information, the service device comprising
        a second processor configured to
            resize an image to obtain a plurality of resized images, each of the plurality of resized images resized to match at least one resolution among a plurality of resolutions,
            further resize each of the plurality of the resized images at a ratio set to match screen density information, respectively, and
            transmit, in response to the received image request, an image among the plurality of resized images or the further resized images to the terminal via the network;
    wherein the second processor of the service device is configured to
        check whether the resolution value of the terminal is received from the terminal,
        when the resolution value of the terminal is received from the terminal, select, based on the received resolution value and the received image request, one of the plurality of the resized images stored in the service device and transmit the selected resized image to the terminal via the network, and
        when the screen density information is received from the terminal, select, based on the received screen density information and received image request, one of the further resized images stored in the service device and transmit the selected further resized image to the terminal via the network.

2. A service device for providing a resized image to a terminal, the service device comprising:
    a communication unit configured to communicate with the terminal via the network;
    a processor configured to
        resize an image to obtain a plurality of resized images, each of the plurality of resized images resized to match at least one resolution among a plurality of resolutions, further resize each of the plurality of the resized images at a ratio set to match screen density information, respectively, and transmit, in response to an image request for an image from the terminal via a network, an image among the plurality of resized images or the further resized images to the terminal through the communication unit; and a storage unit configured to store the plurality of resized images and the further resized images;

wherein the processor is configured to check whether a resolution value of the terminal or screen density information of the terminal is received from the terminal, when the resolution value of the terminal is received from the terminal, select, based on the received resolution value and the received image request, one of the plurality of the resized images stored in the storage unit and transmit the selected resized image to the terminal through the communication unit, and when the screen density information of the terminal is received, select, based on the received screen density information and received image request for the image, one of the further resized images stored in the service device and transmit the selected further resized image to the terminal through the communication unit.

3. The service device of claim 2, wherein the screen density information includes a screen density value supported in an application installed on the terminal, and wherein the screen density value includes a dot per inch (dpi) value of an area on which the image is displayed.

4. The service device of claim 3, wherein the processor is configured to calculate the resolution value of the terminal from the screen density information using $$R = V_{dpi} \times \frac{1}{X}$$

Where R represents the resolution value, $V_{dpi}$ is a dpi value of an area on which a corresponding image is displayed on the display unit of the terminal, and X is a ratio value set to match the screen density information.

5. A terminal for requesting an image to a service device, the terminal comprising:

a display unit;

a processor configured to perform at least one application, wherein the application includes one attribute of a plurality of attributes representing screen densities, the plurality of attributes including a first attribute indicating a first screen density, a second attribute indicating a second screen density, and a third attribute indicating both of the first screen density and the second screen density, transmit an image request in response to a request for the image from the application, determine whether an attribute included in the application is the third attribute, when the included attribute is the third attribute, transmit, to the service device via a network, a resolution value of an area for displaying the requested image on the display unit, and when the included attribute is the first attribute or the second attribute, transmit, to the service device via the network, screen density information of the included attribute;

a storage unit configured to store the at least one application;

an output unit configured to output an execution screen of the running application and the image;

a communication unit configured to communicate with the service device via the network under control of the processor; and an input unit configured to receive a user's input including execution of the running application.

6. An image providing method for providing a resized image to a terminal, the method performed by a processor and comprising:

resizing an image to obtain a plurality of resized images, each of the plurality of resized images resized to match at least one resolution among a plurality of resolutions;

further resizing each of the plurality of the resized images at a ratio set to match screen density information, respectively;

receiving an image request from the terminal over a network;

when a resolution value of the terminal is received from the terminal over the network, selecting, based on the received resolution value and the received image request, one of the plurality of the resized images, and providing the selected resized image to the terminal via the network, and when screen density information is received from the terminal over the network, calculating a resolution value from the received screen density information, selecting, based on the calculated resolution value and the received image request, one from the further resized images, and providing the selected further resized image to the terminal via the network.

7. The image providing method of claim 6, wherein the screen density information includes a screen density value supported in an application installed on the terminal, and wherein the screen density value includes a dot per inch (dpi) value of an area on which the image is displayed.

8. The image providing method of claim 7, wherein the further resizing each of the plurality of the resized images includes at least one of:

further resizing each of the resized images having at least one resolution at a ratio of about 1.3333 corresponding to screen density value of ldpi;

further resizing each of the resized images having at least one resolution at a ratio of about 1 corresponding to screen density value of mdpi;

further resizing each of the resized images having at least one resolution at a ratio of about 0.6666 corresponding to screen density value of hdpi; and further resizing each of the resized images having at least one resolution at a ratio of about 0.5 corresponding to screen density value of xhdpi.

\* \* \* \* \*